(12) United States Patent
Kang et al.

(10) Patent No.: US 7,470,386 B2
(45) Date of Patent: Dec. 30, 2008

(54) ROLL-TO-ROLL EMBOSSING TOOLS AND PROCESSES

(75) Inventors: Gary Y. M. Kang, Fremont, CA (US);
Scott C. J. Tseng, San Jose, CA (US);
HongMei Zang, Sunnyvale, CA (US);
Rong-Chang Liang, Cupertino, CA (US)

(73) Assignee: Sipix Imaging, Inc., Fremont, CA (US)

( * ) Notice: Subject to any disclaimer, the term of this patent is extended or adjusted under 35 U.S.C. 154(b) by 641 days.

(21) Appl. No.: 11/111,076

(22) Filed: Apr. 20, 2005

(65) Prior Publication Data

US 2005/0239935 A1 Oct. 27, 2005

Related U.S. Application Data

(60) Provisional application No. 60/565,794, filed on Apr. 26, 2004.

(51) Int. Cl.
*B29C 33/40* (2006.01)
*B29C 33/38* (2006.01)
(52) U.S. Cl. ..................................... 264/227; 264/220
(58) Field of Classification Search ................ 264/227, 264/220
See application file for complete search history.

(56) References Cited

U.S. PATENT DOCUMENTS

| | | | |
|---|---|---|---|
| 3,144,331 A | 8/1964 | Thommes | |
| 3,380,825 A | 4/1968 | Webbers | |
| 3,741,800 A * | 6/1973 | Baier et al. | 428/625 |
| 4,855,212 A | 8/1989 | Tate et al. | |
| 4,923,572 A | 5/1990 | Watkins et al. | |
| 5,098,696 A | 3/1992 | Montgomery | |
| 5,156,863 A | 10/1992 | Pricone et al. | |
| 5,327,825 A | 7/1994 | Parker et al. | |
| 5,585,415 A | 12/1996 | Gorzalski et al. | |
| 5,993,702 A * | 11/1999 | Davis | 264/1.34 |
| 6,033,518 A | 3/2000 | Backfisch | |
| 6,284,072 B1* | 9/2001 | Ryan et al. | 156/59 |
| 6,329,123 B1 | 12/2001 | Lundy et al. | |
| 6,348,999 B1 | 2/2002 | Summersgill et al. | |
| 6,773,860 B2* | 8/2004 | Kuroki et al. | 430/200 |

FOREIGN PATENT DOCUMENTS

| | | |
|---|---|---|
| JP | 2002-129002 | 5/2002 |
| TW | 1248452 | 2/2006 |
| WO | WO 01/67170 | 9/2001 |
| WO | PCT/US2005/014152 | 10/2006 |

OTHER PUBLICATIONS

Search Report of TW Patent Application No. 094111821 dated Mar. 7, 2007.
Allen, K. (Oct. 2003). Electrophoretics Fulfilled. *Emerging Displays Review: Emerging Display Technologies, Monthly Report—October 2003*, 9-14.

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, I9.6.1.
Chen, S.M. (Jul. 2003) The Applications for the Revolutionary Electronic Paper Technology. *OPTP News & Letters*, 102, 37-41. (in Chinese, English abstract attached, full translation available upon request).
Chen, S.M. (May 2003) The New Applications and the Dynamics of Companies. *TRI*. 1-10. (In Chinese, English abstract attached, full translation available upon request).
Chung, J., Hou, J., Wang, W., Chu, L.Y., Yao, W., & Liang, R.C. (Dec. 2003). Microcup(R) Electrophoretic Displays, Grayscale and Color Rendition. *IDW*, AMD2/EP1-2, 243-246.
Harvey, "Replication Techniques for Miro-optics", *SPIE Proc.*, vol. 3099, pp. 76-82 (1997).
Ho, C.,& Liang, R.C. (Dec. 2003). *Microcup (R) Electronic Paper by Roll-to-Roll Manufacturing Processes*. Presentation conducted at FEG, Nei-Li, Taiwan.
Lee, H., & Liang, R.C. (Jun. 2003) SiPix Microcup(R) Electronic Paper—An Introduction. *Advanced Display*, Issue 37, 4-9 (in Chinese, English abstract attached, full translation available upon request).
Liang, R.C. (Feb. 2003) *Microcup(R) Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.
Liang, R.C., Hou, J., Chung, J., Wang, X., Pereira, C., & Chen, Y. (2003). Microcup(R) Active and Passive Matrix Electrophoretic Displays by A Roll-to-Roll Manufacturing Processes. *SID Digest*, 20.1.
Liang, R.C., Hou, J., & Zang, H.M. (Dec. 2002) Microcup Electrophoretic Displays by Roll-to-Roll Manufacturing Processes. *IDW*, EP2-2, 1337-1340.
Liang, R.C., Hou, J., Zang, H.M., & Chung, J. (Feb. 2003). *Passive Matrix Microcup(R) Electrophoretic Displays*. Paper presented at the IDMC, Taipei, Taiwan.
Liang, R.C., Hou, J., H.M., Chung, J., & Tseng, S. (2003). Microcup(R) displays : Electronic Paper by Roll-to-Roll Manufacturing Processes. *Journal of the SID*, 11(4), 621-628.
Liang, R.C., & Tseng, S. (Feb. 2003). *Microcup(R) LCD, An New Type of Dispersed LCD by A Roll-to-Roll Manufacturing Process*. Paper presented at the IDMC, Taipei, Taiwan.
Nikkei Microdevices. (Dec. 2002) Newly-Developed Color Electronic Paper Promises—Unbeatable Production Efficiency. *Nikkei Microdevices*, 3. (in Japanese, with English translation).
Slafer, et al., "Continuous Manufacturing of Thin Cover Sheet Optical Media", *SPIE Proc.*, vol. 1663, pp. 324-335 (1992).
Wang, X., Kiluk, S., Chang, C., & Liang, R.C. (Feb. 2004). Microcup (R) Electronic Paper and the Converting Processes. *ASID*, 10.1.2-26, 396-399, Nanjing, China.

(Continued)

*Primary Examiner*—Tae H Yoon
(74) *Attorney, Agent, or Firm*—Howrey LLP

(57) ABSTRACT

The invention is directed to a polymer shim and a roll-to-roll process for its manufacture.

14 Claims, 6 Drawing Sheets

OTHER PUBLICATIONS

Zang, H.M. (Feb. 2004). *Microcup Electronic Paper*. Presentation conducted at the Displays & Microelectronics Conference of U.S. Display Consortium, Phoenix, Arizona, USA.

Zang, H.M. (Oct. 2003). *Microcup (R) Electronic Paper by Roll-to-Roll Manufacturing Processes*. Presentation conducted at the Advisory Board Meeting, Bowling Green State University, Ohio, USA.

Zang, H.M., & Liang, R.C. (2003) Microcup Electronic Paper by Roll-to-Roll Manufacturing Processes. *The Spectrum*, 16(2), 16-21.

Zang, H.M, Hwang, J.J., Gu, H., Hou, J., Weng, X., Chen, Y., et al. (Jan. 2004). Threshold and Grayscale Stability of Microcup (R) Electronic Paper. *Proceeding of SPIE-IS&T Electronic Imaging, SPIE* vol. 5289, 102-108.

\* cited by examiner

ROLL-TO-ROLL EMBOSSING TOOLS AND PROCESSES

RELATED APPLICATION

This application claims the priority under 35 USC 119(e) of U.S. Provisional Application No. 60/565,794 filed on Apr. 26, 2004, the content of which is incorporated herein by reference in its entirety.

BACKGROUND OF THE INVENTION

1. Field of the Invention

The invention is directed to a polymer shim and a roll-to-roll process for its manufacture.

2. Description of Related Art

Image embossing tools have been disclosed previously. U.S. Pat. No. 4,923,572 (hereinafter referred to as the '572 patent) discloses a generally cylindrical image embossing tool which can be used for embossing a material on a web. The method for the manufacture of the image embossing tool involves multiple steps, including (1) placing an embossable material around the surface of a rigid cylinder, (2) stamping a desired image or pattern onto the embossable layer with a stamper, (3) electroforming to form a nickel electroform on the outer surface of the embossable layer, (4) applying a reinforcement layer over the electroform, (5) removing the rigid cylinder; (6) stripping the embossable layer to form a plating mandrel, (7) forming a second electroform by electrodeposition of a metal on the interior of the plating mandrel and (8) removing the second electroform. According to the '572 patent, multiple copies of the second electroform can be prepared in the same manner and they may then be placed over a carrier cylinder or a plurality of rollers to form an embossing tool to allow continuous embossing. This embossing tool and its manufacturing process, however, suffer many disadvantages. For example, the process requires a cylindrical or belt type of embossing tool and the stamping surface of the stamper must have a curvature corresponding precisely to the curvature of the embossable material on the rigid cylinder. This is difficult to accomplish in practice. Secondly, both the first and second electroforms are of a metal material such as Ni. It may be difficult to separate the two electroforms in the cylinder form, particularly when a complex structure of a high aspect ratio is to be duplicated. In addition, if a cutting step is involved in the separation of a metal shim, it will be difficult to rejoin the pieces to form a seamless embossing cylinder or drum. Furthermore, it is very difficult to maintain a uniform and precise surface profile if the shim to be formed by this process has a steep 3D profile such as a depth of larger than 10 um and an incline angle of less than 10°.

U.S. Pat. No. 5,327,825 (hereinafter referred to as the '825 patent) discloses a method for forming a die through embossing or microembossing. More specifically, the method involves embossing a pattern or design onto a silver layer coated on a cylindrical surface, via the use of a concave shaped stamping surface which carries the pattern or design to be imparted onto the silver layer and has a radius matching the radius of the cylindrical surface. This microembossing step is carried out multiple times so that the die prepared from the method has a repeated pattern or design from the concave-shaped stamping surface. This method has disadvantages similar to those of the process of the '572 patent (e.g., difficulty in matching the radii of the stamping surface and the cylindrical surface, maintaining precise and uniform surface profile and the formation of a seamless tool for complicated structures, particularly those with a deep 3D profile).

U.S. Pat. No. 5,156,863 (hereinafter referred to as the '863 patent) discloses a method for manufacturing a continuous embossing belt. The method involves combining a series of "masters" or "copies" in a cluster to provide a desired pattern in a fixture and an electroform strip is formed of the cluster. The embossing belt is formed after multiple electroforming steps starting from a master cluster fixture. One of the drawbacks of this method is the difficulty to generate the individual masters or copies for the cluster with a uniform height (or thickness). In addition, a grinding step is required in this method to eliminate surface imperfections. It is also difficult in this method to avoid damage on the mandrel and shim during separation of the electroformed nickel shim from its nickel mandrel, particularly when a complicated structure with a deep 3D profile is involved.

Furthermore, all of the processes discussed above can only produce one embossing tool at a time.

SUMMARY OF THE INVENTION

The first aspect of the present invention is directed to a composition for the preparation of a polymer shim.

The second aspect of the present invention is directed to a strippable composition for the preparation of a polymer shim.

The third aspect of the present invention is directed to a roll-to-roll process for the production of a polymer shim.

The fourth aspect of the invention is directed to the use of a polymer shim for the manufacture of a metallic embossing mold or shim.

The fifth aspect of the invention is directed to a joining process for the manufacture of a wide format polymer shim of a uniform surface profile and a low defect rate.

The present invention has many advantages which will be discussed in detail in the "Detailed Description of the Invention" section below.

BRIEF DISCUSSION OF THE DRAWINGS

DETAILED DESCRITION OF THE INVENTION

Figure 1:
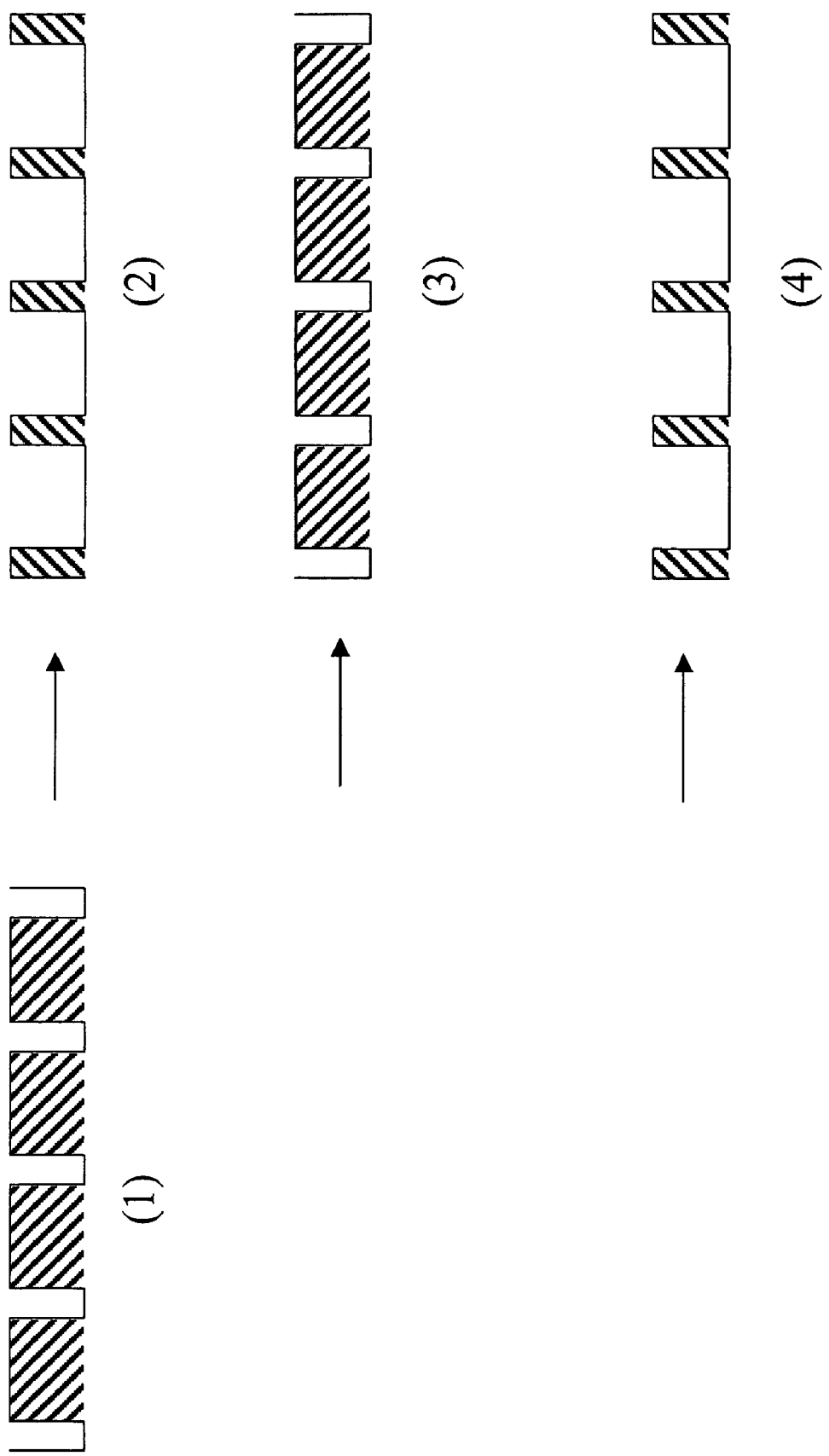
FIG. 1 illustrates the terminology of the present invention.

For clarity, the terminology used in this application is illustrated in FIG. 1.

I. Preparation of the Master Mold

The term "master mold", in the context of this application, refers to a mold (1 in FIG. 1) which may be used for the preparation of a polymer shim (2 in FIG. 1) of the present invention. If the master mold is a male version, the polymer shim of the present invention would be the corresponding female version.

The master mold is usually prepared by a photolithography or diamond turn process followed by electroforming. Typical materials used for electroforming may include, but are limited to, nickel, nickel cobalt and other alloys. After electroforming, a photoresist or diamond turn master is removed to form the master mold.

A master mold can be formed from nickel by nickel sulfamate electroforming or electroless nickel deposition as described in "Continuous Manufacturing of Thin Cover Sheet Optical Media", SPIE Proc., Vol. 1663, page 324 (1992).

Other methods for preparing a master mold include microengineering techniques such as e-beam writing, dry etching, chemical etching, laser writing or laser interference as described in "Replication Techniques for Microoptics", SPIE Proc., Vol. 3099, page 76 (1997).

In addition, the master mold may also be formed by photomachining using plastics, ceramics or metals.

II. Preparation of Polymer Shim (i) Composition for Polymer Shim

The polymer shim of the present invention is formed from an embossable composition.

In a so-called "hard-embossing" system, the embossable composition may be a thermoplastic polymer. The thermoplastic polymer may be plasticized by an appropriate plasticizer or solvent, such as butyl acetate, cyclohexanone, butanol, diester or diether of ethylene glycol, dialkyl phthalate or trialkyl phosphate. Useful embossable thermoplastic polymers may include, but are not limited to, cellulose acetate butyrate (CAB), cellulose acetate propionate (CAP), cellulose acetate, cellophane (regenerated cellulose), poly methyl methacrylate (PMMA), polyethyl methacrylate (PEMA), polycarbonate (PC), polyvinyl chloride (PVC), polystyrene (PS), polyester, polyamide, polyurethane, polyolefin, polyvinylbutyral and copolymers thereof.

Alternatively, a "soft-embossing" system may be used. In this case, the embossable composition may be a radiation curable, particularly UV curable, composition comprising a multifunctional monomer or oligomer.

Useful multifunctional monomers or oligomers may include, but are not limited to, multifunctional acrylates, multifunctional methacrylates, multifunctional vinyls, multifunctional vinylethers, multifunctional allyls, multifunctional epoxides and other monomers or oligomers containing crosslinkable functional groups. Acrylated monomers or oligomers, such as acrylated polyurethanes, polyesters, siloxanes, acrylics, novolacs and epoxides having an average molecular weight from about 300 to about 50,000, preferably from about 500 to about 10,000, are particularly useful.

To improve the film integrity and control the viscoelastic properties of the coating, the radiation curable composition may further comprise a polymer binder or thickener. Useful binders or thickeners may include, but are not limited to, those thermoplastic polymers used in the above-mentioned "hard-embossing" system.

The composition may also comprise a photoinitiator, photosensitizer or coinitiator. Suitable photoinitiators, photosensitizers or coinitiators may include, but are not limited to, Norrish Type 1, Type 2 and Type 3 photoinitiators such as ITX (isopropyl thioxanthone), Irgacure 651 (2,2-dimethoxy-1,2-diphenylthane), 907 (2-methyl-1-[4-(methylthio)phenyl]-2-morpholino-1-propanone), 369 (2-benzyl-2-(dimethylamino)-1-[4-(4-morpholinyl)phenyl)]-1-butanone) and 184 (1-hydroxycyclohexylphenylketone), from Ciba Specialty Chemicals.

The radiation curable composition is particularly useful when a mold or shim of a complicated structure with a deep 3D profile is involved. A release agent or reactive release monomer or oligomer, such as wax, silicone oil, a perfluorinated liquid or powder, an acrylated silicone, a fluorinated acrylate or a fluorinated epoxy, may be included in the radiation curable composition to facilitate the release of the polymer shim from the master mold and prolong the life of the master mold.

An example of a radiation curable composition useful for the formation of a polymer shim of the present invention is shown below.

A Radiation Curable Composition for the Formation of a Polymer Shim

| Component | Typical Range | Preferred Range |
|---|---|---|
| Multifunctional Monomer/Oligomer | 10-90% | 20-75% |
| Binder or Thickener | 5-60% | 25-45% |
| Release Agent or Reactive Release Monomer/Oligomer | 0-10% | 1-8% |
| Photoinitiator, Photosensitizer or Coinitiator | 0.1-5% | 1-3% |

The components may be diluted or dissolved in a suitable solvent or solvent mixture to achieve good coatability. Suitable solvents may include, but are not limited to, ketones such as methylethylketone (MEK), methyl propyl ketone (MPK), methyl butyl ketone (MBK), cyclohexanone or acetone; esters such as ethyl acetate, propyl acetate or butyl acetate; alcohols such as ethanol, propanol or butanol; ethers such as tetrahydrofuran or dialkoxyethane; amides such as dimethyl acetamide; alkylbenzenes such as toluene or xylene, and the like.

The polymer shim of the present invention may be used for the formation of first generation molds or shims (3 in FIG. 1) which are usually formed of a metal material. The first generation mold or shim is usually used for the preparation of the intended microstructures.

To facilitate the separation of the polymer shim from the first generation metal mold, the embossable composition preferably is strippable. Such a strippable composition may be the radiation curable composition as described above further comprising a binder or thickener. Useful binders or thickeners are soluble or dispersible in an organic solvent or an alkaline solution. The binders or thickeners may be polymers having a carboxylic functionality. Examples of suitable binders or thickeners may include, but are not limited to, copolymers of acrylic acid, methacrylic acid, itaconic acid, maleic acid or maleic anhydride. The binder or thickener usually takes up about 5 to about 60% by weight of the strippable composition.

When such a strippable composition is used, in most cases, the first generation metal mold prepared from the polymer shim may be separated without leaving any polymer residue or scum on the metal. If necessary, the first generation metal mold may be further cleaned or stripped using an alkaline solution, such as tetramethylammonium hydroxide solution in a concentration ranging from about 0.1 N to about 10 N, preferably from about 0.5 N to about 5 N.

To increase the shelf life of the radiation curable composition for the polymer shim, an inhibitor or antioxidant may also be added. Suitable inhibitors or antioxidants may include, but are not limited to, BHT (butylated hydroxytoluene), MEHQ (hydroquinone monomethylether) and tetrakis [methylene-3(3',5'-di-tert-butyl-4-hydroxyphenyl)propionate]methane. The inhibitor or antioxidant may be present in the amount of about 0.1% to about 5%, preferably about 0.1% to about 1%, by weight.

Air may also be pumped into the radiation curable composition to prevent the multifunctional monomer or oligomer from polymerization during storage.

(ii) Process for Manufacture of the Polymer Shim

Figure 2:
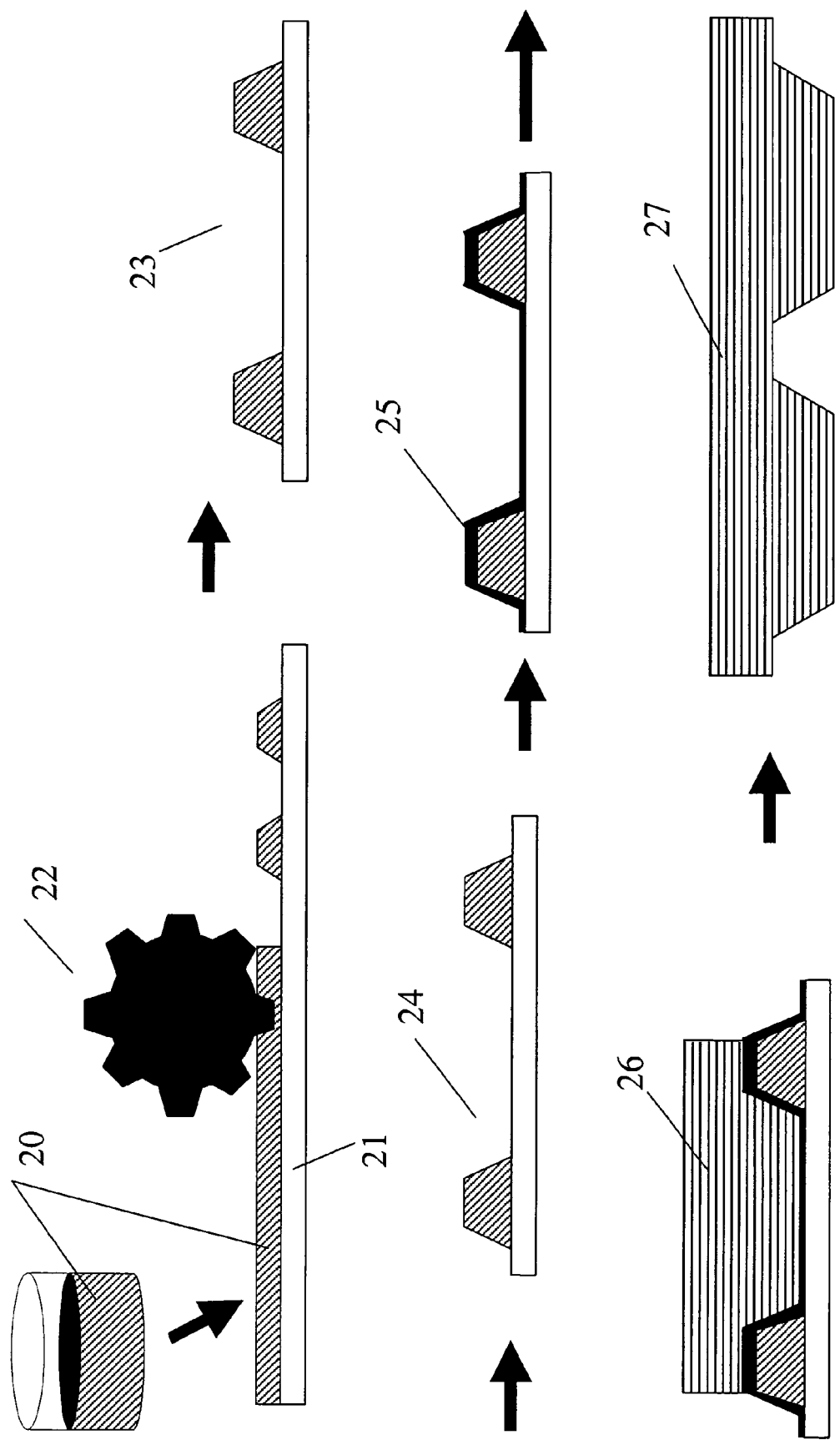
FIG. 2 is a schematic process flow for the formation of a polymer shim.

FIG. 2 is a flow chart illustrating a process for the formation of a polymer shim of the present invention.

The embossable composition (20) as described above is coated onto a substrate (21) and dried to achieve appropriate viscoelastic properties for embossing.

Useful substrates for the present invention may include, but are not limited to, polyethylene phthalate (PET), polybutylene phthalate (PBT), polyethylene naphthalate (PEN), cellulose triacetate, polycarbonate, polyimide, polysulfone, polyamide and polyolefins.

The embossable composition (20) is typically embossed by a master mold (22) referred to in Section I above, in the form of a roller, plate or belt at a temperature higher than the heat distortion temperature (HDT) or glass transition temperature (Tg) of the embossable composition. The HDT or Tg for a typical embossable composition may range from about −70° C. to about 150° C., preferably from about −20° C. to about 100° C. A heated master mold or a heated housing substrate against which the mold presses may be used to control the embossing temperature and pressure.

The height of surface relief of the master mold of the present invention may be between about 0.01 to about 100 um, preferably between about 0.1 to about 50 um. The aspect ratio (height/width ratio) of the embossed structure may be between about 0.1 to about 20, preferably between about 0.1 to about 10.

There may be an optional primer layer or a surface treatment layer (not shown) between the substrate and the layer of the embossable composition to enhance the adhesion or coating quality. The composition of the primer layer or surface treatment layer may include, but are not limited to, polyurethane, epoxy, pre-cured epoxy acrylate, urethane acrylate, polyester acrylate and the like. Alternatively, it may involve surface pretreatment of the substrate layer with, for example, corona, plasma or flame.

A polymer shim (23) is formed after the embossable composition is hardened by radiation, heat or solvent evaporation. The polymer shim is the corresponding female version of the master mold.

The polymer shim of the present invention may be produced sheet by sheet or preferably in a roll which could be of any length. The width of the sheet or roll is usually in the range of about 1 inch to about 90 inches. In addition, multiple (e.g., hundreds or thousands) sheets of the polymer shim can be produced continuously on a web.

III. Cutting and Joining of the Polymer Shim

If there is a defect on the polymer shim, the portions with defects may be easily cut out. To have a good cutting quality, the polymer shim may be sandwiched between two pieces of thick plastic plate, e.g., two acrylic or polycarbonate plates, and then be end milled by a boring mill machine. Alternatively, the polymer shim may be first chilled by, for example, liquid nitrogen and then cut by a sharp knife, or any other precision cutting machine.

Multiple pieces of the polymer shim may be joined together and the difference in height (or thickness) of the different pieces of polymer shim prepared from the current process may be controlled to be less than 1 micron. For example, from a jumbo roll of a polymer shim prepared by a continuous process, two pieces of the polymer shim may be carefully selected and cut to eliminate any defects. The two pieces are then joined together, preferably with the pattern side facing down. An adhesive is applied at the seam line and allowed to be sucked into the seam by capillary force. Suitable adhesives may include, but are not limited to, UV/EB curable adhesives, epoxies, silicones, cyanoacrylate, polyurethane, acrylic adhesives and the like. The viscosity of the adhesive is preferably in the range from about 50 cps to about 30,000 cps, more preferably from about 1000 to about 10000 cps. The application of the adhesive may be done by a syringe, wire wound bar or doctor blade, optionally with an autodispenser. The two pieces of the polymer shim to be joined together may be placed on a very flat surface such as a LCD glass plate and held together mechanically, or by adhering onto a flat substrate plate by vacuum, static attraction force or a thin layer of a temporary adhesive which may be removed later by, for example, heat, solvent or UV.

By cutting off any defected areas and joining the remaining pieces together as described, the present process has the advantage that a large number of substantially perfect shims may be prepared from a master mold which may have defects.

IV. Preparation of the First Generation Mold or Shim

The first generation mold or shim (3 in FIG. 1) has the same configuration as the master mold and it may be prepared from the polymer shim of the present invention.

A. Flat First Generation Mold or Shim

If necessary, once a polymer shim is generated, it may be cut into any shapes and sizes and joined together, following the procedure as described above.

The formation of the first generation mold or shim involves several steps, including surface treatment (24), conductive seed layer coating (25) and electroforming (26), as shown in FIG. 2.

For the surface treatment (24), corona or plasma treatment or UV radiation may be used to increase the adhesion between the polymer shim and the subsequent conductive seed layer coating.

The conductive seed layer coating (25) may involve a thin layer coating of silver, nickel or nickel-chrome alloy by, for example, sputtering, physical or chemical vapor deposition, evaporation or electroless plating by reduction reaction. Silver or nickel seed coating is usually used, with silver seed coating as more preferred.

The first generation mold or shim (usually formed of nickel) may be prepared from the polymer shim by an electroforming process after the surface of the polymer shim has been silver coated as shown in FIG. 2. The silver seed coating (25) provides a conductive function for the subsequent electroforming step. Either the sputtering or evaporation method may be used for the silver coating. The silver coating preferably has a thickness of about 0.01 to about 1 um, more preferably about 0.05 to about 0.5 um.

A passivation treatment on the surface of the silver coating may be optionally used to decrease the adhesion between the silver coating and the subsequent nickel layer.

A nickel layer (26) is finally deposited onto the silver coated polymer shim, after which the polymer shim is separated from the first generation Ni mold or shim (27).

Because multiple sheets of the polymer shim (23) can be produced at high speed by the roll-to-roll process of the present invention, the first generation mold or shim (27) having the same configuration as the master mold (22) may be mass produced.

Optionally, the first generation mold or shim (3 in FIG. 1) produced may be used for the manufacture of second generation polymer shims in mass production.

B. Roll-type First Generation Mold or Shim

Figure 3:
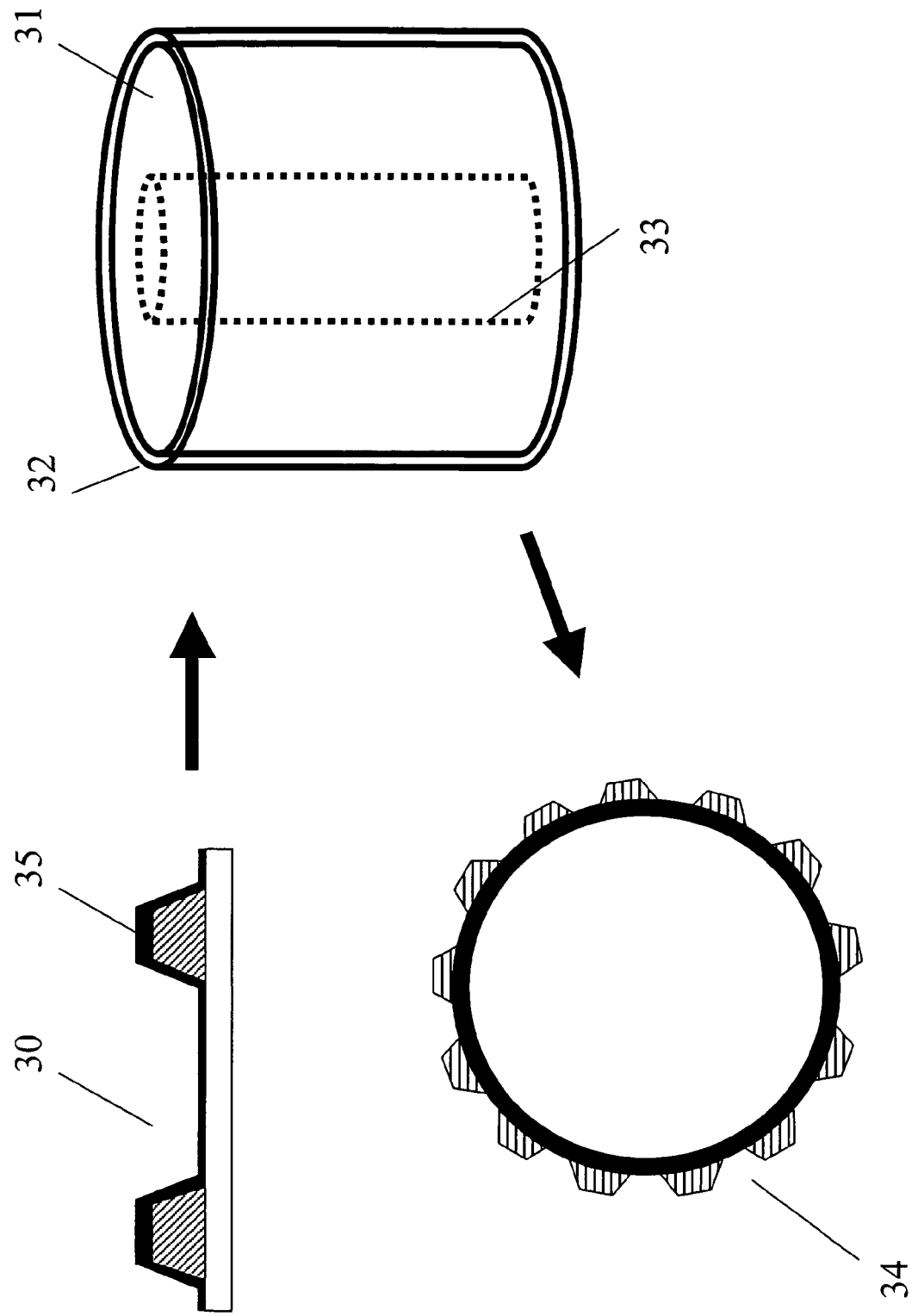
FIG. 3 is a schematic drawing of a weld-less shim preparation process.

In addition to the flat first generation male mold or shim, a cylindrical or roll type of a first generation mold or shim (34) may also be prepared by, for example, the process illustrated in FIG. 3 wherein the two edges of a flat, silver-coated polymer shim (30) of the present invention are joined together with the silvered pattern facing inward by one of the joining methods described above. The joined cylindrical polymer shim (31) is inserted and snugly fitted into a cylindrical shell (32) optionally with an adhesive at the seam line.

An anode rod or cylindrical basket (33) is inserted into the center and electroforming is performed onto a cathode polymer shim (31). The composite of the cylindrical first generation mold or shim and the silver-coated polymer shim (30) is then removed from the shell (32). The silver-coated polymer shim (30) may then separated physically by, for example, cutting the polymer shim followed by peeling or chemically stripping off the polymer shim (30) from the first generation mold or shim (34). Alternatively, the silver coating (35) on the polymer shim (30) may be accomplished by, for example, sputtering, after the polymer shim is assembled into the cylinder shell (32) as described above. The first generation molds or shims prepared by this method do not have a visible seam or weld line.

Still alternatively, a diameter-adjustable cylindrical shell support with its gap perpendicular to the circular face may be used. The gap could be held together and tightened by screws. The polymer shim may be precisely cut, coated with a conductive seed layer and inserted into the diameter-adjustable cylindrical shell support with the seed layer facing inward. The two ends of the polymer shim may be joined by tightening the screws. The joined polymer shim may be used directly in the subsequent electroforming step without the need of an edge adhesive. The use of this type of adjustable cylindrical support also allows the electroformed parts to be easily retrieved from the cylinder by simply loosening up the screws. Polishing of the seam line, after electroforming and after the first generation mold or shim is removed from the cylindrical shell, may be necessary.

The present invention is applicable to the preparation of embossing tools used in any embossing process, including the microembossing process as disclosed in a co-pending application, U.S. Ser. No. 09/518/488, filed on Mar. 3, 2000 (corresponding to WO01/67170), the content of which is incorporated herein by reference in its entirety. More specifically, the first generation mold or shim may be used for the preparation of the microcups referred to therein.

V. Polishing of the Mold Surface

While the first generation mold or shim prepared from the present invention generally has a smooth surface and uniform depth of grooves, it may be further improved by post-polishing of the mold surface. In the following discussion, the mold or shim prepared directly from the polymer shim is referred to as the "first generation mold or shim", to be distinguished from the molds or shims of subsequent generations.

Figure 6:
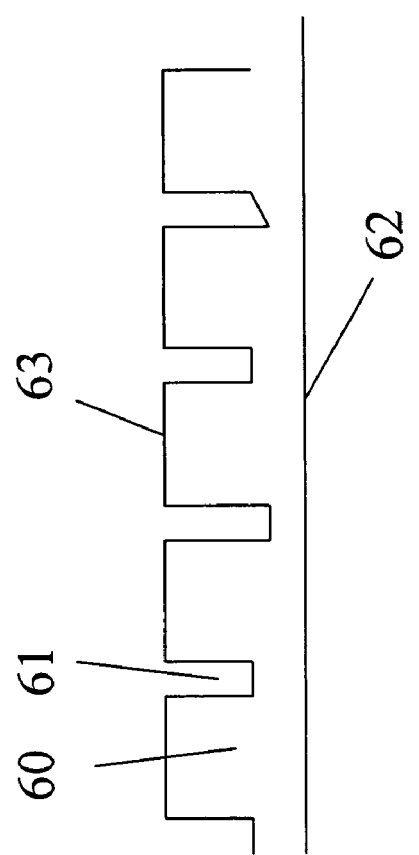
FIG. 6 depicts a cross-section view of a first generation mold showing protruding elements and grooves.

FIG. 6 depicts a cross-section of the first generation mold produced from the present invention showing protruding elements (60) and grooves (61). In the manufacture of microcups as described in the co-pending application, U.S. Ser. No. 09/518,488, the protruding elements correspond to the microcups whereas the grooves correspond to the partition walls between the microcups.

The post-polishing of the mold surface may be carried out in multiple steps starting with an ultra flat first generation mold. The height of the protruding elements or the depth of the grooves of the first generation mold is measured with, for example, a surface profiler. The first generation mold is then mounted on a precision flat surface plate. This step is critical since the backside (62) is used as a reference point for height. The first generation mold with the surface plate is then mounted on a linear stage attached to a polish system, such as the Buehler Automet 2 polishing system. The system uses a power head with an attachment for various grades of polishing cloth and rotates with various speeds for different polishing levels. The first generation mold will move under the polishing head which becomes in contact with the mold surface (63).

In one specific embodiment, a 6 micron Metadi Supreme Polycrystalline Diamond Suspension and Buehler Texmet 1000 polishing cloth are used. The polishing cloth is preferably used in the form of a moving carrier under an optimal pressure, to allow continuous polishing of the surface. To avoid undesirable contamination of the grit or powder resulting from the polishing step, a removable masking coating or filler material such as wax, silicone or other solvent soluble or water soluble polymers may be applied to the structure, particularly to the grooves.

The polishing step may be repeated until the surface is smooth or the height of the protruding elements is uniform; the average difference in height preferably is less than about 1 micron, more preferably less than about 0.5 microns. The abrasive particles, grits, debris polished off and the masking coating, if present, are then removed by, for example, mechanical cleaning followed by a solvent washing, ultrasonic bath or rinsing.

Figure 7:
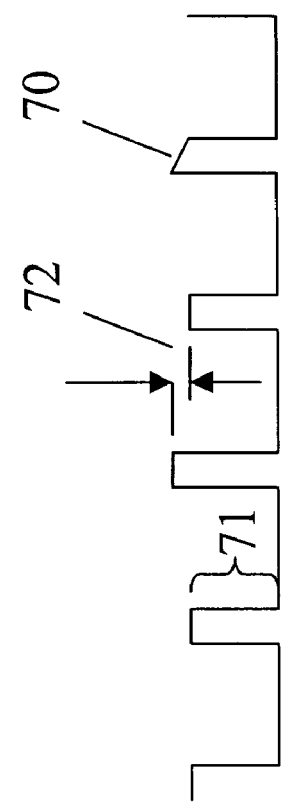
FIG. 7 depicts a second generation mold.

It is often required to prepare subsequent generations of the molds or shims. The second generation mold or shim (corresponding to 4 in FIG. 1 and also shown in FIG. 7) has the same configuration as the polymer shim and is a counterpart of the first generation mold. The purpose of having a second generation mold is to polish off not only the sharp angled tip (70) but also to further ensure uniformity in height (71) of the partition walls.

The polishing steps are similar to those used for the polishing of the first generation mold. As the first step, the height of the partition walls is measured and the reference point determined. The second generation mold with a surface plate is then mounted on a linear stage attached to a polish system and moves under a polishing head which becomes in contact with the top surface to polish off the sharp angled tip (70), if present, and the extra height (72) to ensure uniformity in height of the partition walls.

The conditions (i.e., settings and durations) under which the second generation mold is polished are similar to those for polishing the first generation mold.

After the second generation mold is polished and cleaned, more subsequent generations of the mold may be prepared, if necessary, to ensure high quality of the final mold.

EXAMPLES

The following examples are given to enable those skilled in the art to more clearly understand, and to practice, the present invention. They should not be considered as limiting the scope of the invention, but merely as being illustrative and representative thereof.

Example 1

A. Primer Layer

To a beaker containing 5 gm of an aliphatic polyurethane, (P9815, Huntsman, N.J.), 647.3 gm of MEK and 300 gm of cyclohexanone (CHO), 30 gm of CN983 (UV oligomer from Sartomer, Pa.), 15 gm of EB1290 (UV oligomer from UCB Chemicals, Ga.), 1.72 gm of Irgacure 369 (2-benzyl-2-(dimethylamino) -1-[4-(4-morpholinyl)phenyl]-1-butanone, Ciba Specialty Chemicals, Pa.), 0.35 gm of ITX (SarCure SR1124, 2-isopropyl thioxathone from Sartomer, Pa.) and 0.43 gm of Irganox 1035 (thiodiethylene bis(3,5-di(tert) -butyl-4-hydroxyhydrocinnamate), Ciba Specialty Chemicals, Pa.) were added and mixed homogeneously. The resulted primer solution was then coated on a PET substrate using a #3 Meyer drawdown bar with a targeted dry thickness of about 0.4 um. The dried film was exposed with 1.5 J/cm2 of UV light (Fusion UV, D lamp) in air.

B. Polymer Shim

TABLE 1

Composition of the Polymer Shim

| Component | Example 1 (parts) |
|---|---|
| PBMA-IBMA | 30.00 |
| EB810 | 15.75 |
| HDDA | 47.25 |
| Eb1360 | 7.00 |
| Irgacure 369 | 1.25 |
| Irganox 1035 | 0.50 |

TABLE 2

Chemicals and Suppliers

| | Full Name | Supplier |
|---|---|---|
| PBMA-IBMA | Poly(butyl methacrylate-co-isobutyl methacrylate) | Aldrich |
| EB810 | Ebecryl 810 (polyester acrylate oligomer) | UCB chemical |
| HDDA | HDODA (1,6-Hexanediol Diacrylate) | UCB chemical |
| Eb1360 | Ebecryl 1360 (acrylated silicone oligomer) | UCB chemical |
| Irgacure 369 | Irgacure 369 | Ciba Specialty Chemical |
| Irganox 1035 | Irganox 1035 | Ciba Specialty Chemical |
| MEK | Methyl ethyl ketone | EM Science |

The composition of Example 1B (Table 1) was diluted with MEK and coated onto the primer-coated PET (10 mil) with a targeted dry thickness of 25 um. The coating was dried and then embossed with a master mold for the formation of microcups (110 um pitch and 25.5 um depth) at 160° F. under 50 psi with UV exposure through the back of the PET substrate (0.068 J/cm$^2$, Fusion UV, D lamp) and finally UV postcured (2 J/cm$^2$) from the embossable composition side.

Figure 4:
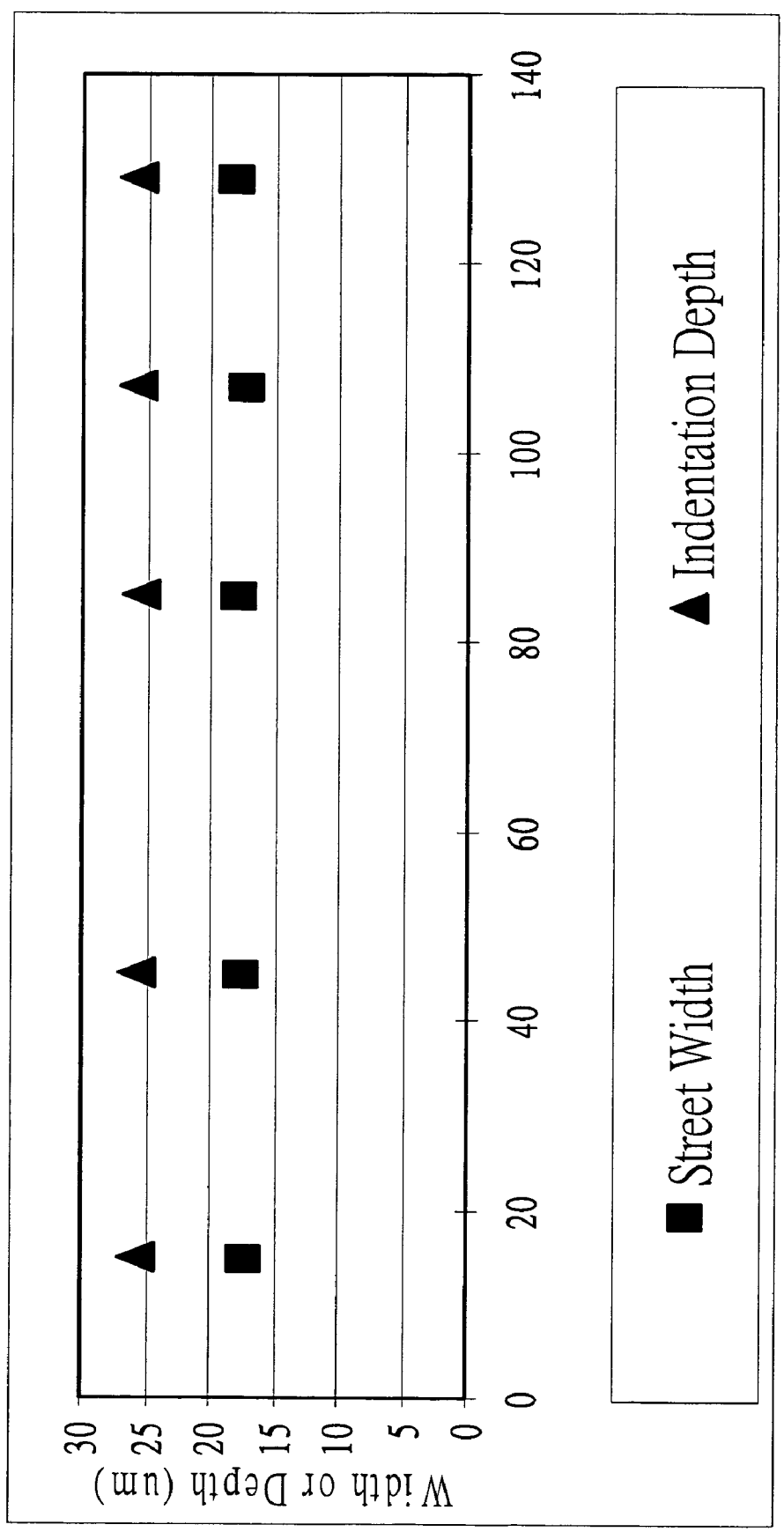
FIG. 4 shows the width or depth of a joined shim according to the present invention.

The depth and street width of the polymer shim as a function of location across the web direction were measured with a Wyko NT1000 surface profiler. FIG. 4 shows that the polymer shim prepared had very consistent microcup depths and street widths.

A thin layer (about 200 nm) of silver was deposited on the polymer shim by sputtering (Perkin Elmer model 2400) to render it electrically conductive. The polymer shim was treated with corona before the sputtering step. The silver layer was then passivated with a 5% potassium dichromate (Aldrich, Mo.) solution at 50° C. for about 3 minutes to improve the separation of the subsequently electroformed Ni shim from the polymer shim.

Example 2

Preparation of the First Generation Mold by Electroforming

The passivated silver-coated polymer shim was electroformed to a desirable thickness in a nickel sulfamate (from MacDermid, Calif.) solution containing about 75 gm/L nickel ions and about 30 gm/L boric acid with a current density of about 15 amp/ft$^2$ and a pH of 4 at 45° C. The electroformed first generation mold was then separated from the polymer shim by peeling or stripping off the polymer layer.

Example 3

Joining Two Polymer shims

Figure 5:
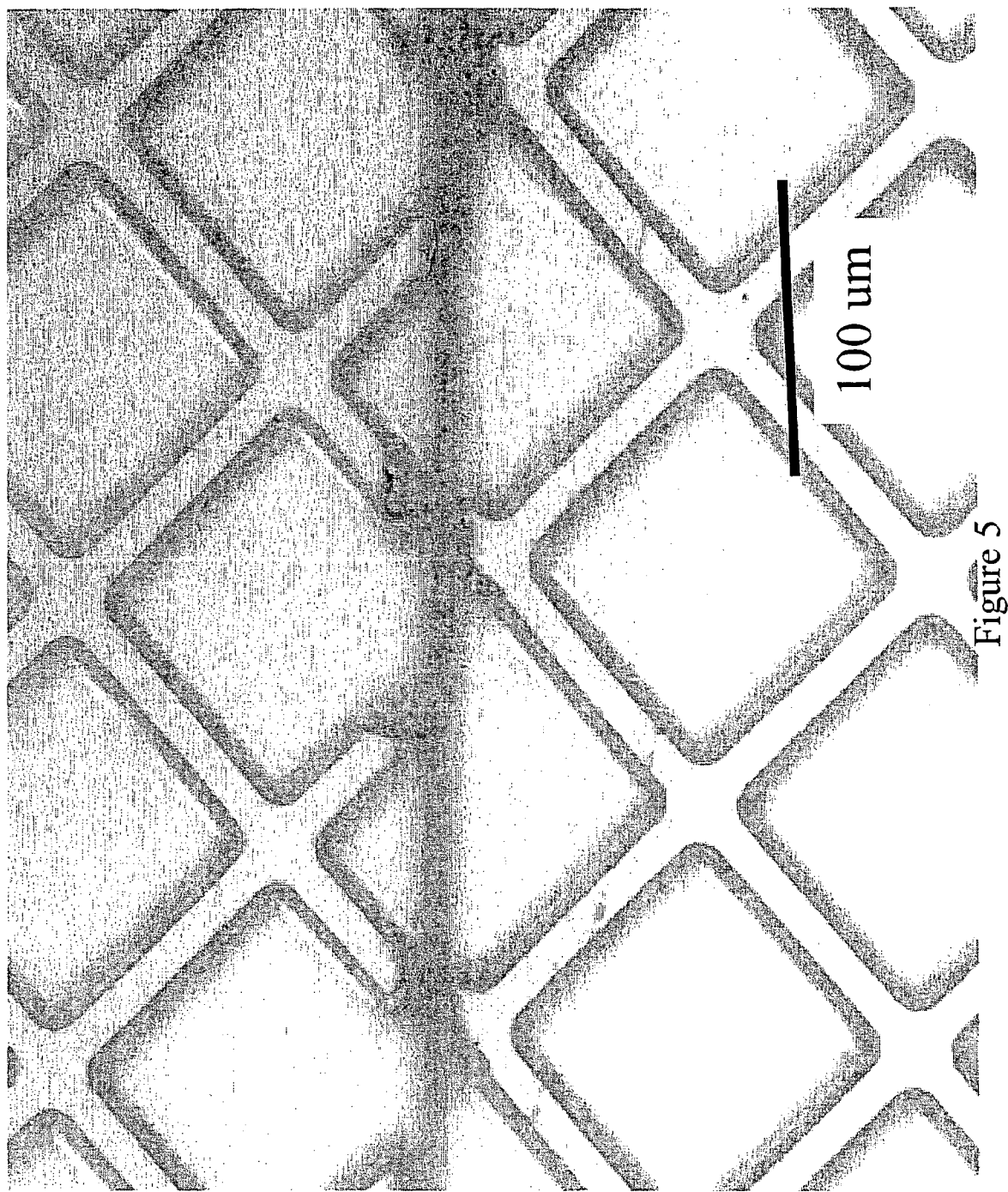
FIG. 5 is a SEM picture of the seam line of a joined polymer shim of the present invention.

Two pieces of the polymer shim were placed side by side on a glass plate with the pattern side facing down. Electrostatic force was applied on the two pieces by electrostatic generator with 10 kV before applying an adhesive. The adhesive (NOA 68 from Norland Products Inc., N.J.) was applied on the seam line and then cured by UV. The 3D surface profile of the joined polymer shim is shown in FIG. 5. The height difference between the two sides of seam line was measured to be less than 1 um (FIG. 4).

Example 4

Strippable Polymer Shim

TABLE 3

Composition of Alkaline Strippable Polymer Shim

| Component | Parts |
|---|---|
| AC 315 | 40.00 |
| EB810 | 13.25 |
| HDDA | 39.75 |
| Eb1360 | 7.00 |
| Irgacure 369 | 1.25 |
| Irganox 1035 | 0.50 |

TABLE 4

Chemical and Supplier

| Component | Full Name | Supplier |
|---|---|---|
| AC 315 | Avalure AC 315 (Acrylates Copolymer) | Noveon, Inc. (Cleveland, OH) |

The procedure of Example 1 was followed except that a composition comprising an alkaline soluble binder, Avalure AC315, as shown in Table 3 was used. The composition was coated, dried and embossed with a master mold for the formation of microcups (110 um pitch and 22 um depth) at 250° F., 80 psi with UV exposure through the back of the PET substrate (0.068 J/cm$^2$, Fusion UV, D lamp), and finally UV postcured (2 J/cm$^2$) from the embossable composition side. As evident from profilometer measurements, the microstructure of the master mold was precisely transferred onto the polymer shim.

A first generation mold was also produced in the same manner as that in Example 1, using the polymer shim of this example. The electroformed first generation mold was easily separated from the polymer shim by peeling or stripping off the polymer layer with microposit MF CD-26 (from Rohm Hass) which is a 0.26N tetramethylammonium hydroxide solution.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A process for the preparation of a first generation metal mold which process comprises:
   a) forming a polymer shim in a roll continuously on a web;
   b) cutting off any defects from the polymer shim and joining the remaining polymer shim which is substantially free of defects;
   c) coating a conductive seed layer over the joined polymer shim; and
   d) electroforming the first generation metal mold.

2. The process of claim 1 wherein said polymer shim is formed from a composition comprising a thermoplastic polymer.

3. The process of claim 1 wherein said polymer shim is formed from a composition comprising a multifunctional monomer or oligomer.

4. The process of claim 1 wherein said conductive seed layer is a thin layer of silver, nickel or nickel-chrome.

5. The process of claim 4 wherein said conductive seed layer is a thin layer of silver.

6. The process of claim 1 wherein said conductive seed layer is coated by sputtering, physical or chemical vapor deposition, evaporation or electroless plating by reduction reaction.

7. The process of claim 1 wherein said electroforming is performed with a nickel layer.

8. The process of claim 5 further comprising a passivation treatment of the surface of the silver coating.

9. The process of claim 1 wherein said first generation metal mold is flat.

10. The process of claim 1 wherein said first generation metal mold is in the shape of a cylinder.

11. The process of claim 1 further comprising surface treating the polymer shim after step (b).

12. The process of claim 1 further comprising polishing the first generation metal mold.

13. The process of claim 1 wherein the thermoplastic polymer is plasticized by a plasticizer or solvent.

14. The process of claim 11 wherein said surface treating is corona treating, plasma treating, or UV radiating.

* * * * *